United States Patent [19]

Namiki

[11] Patent Number: 5,404,024
[45] Date of Patent: Apr. 4, 1995

[54] RADIATION IMAGE READING APPARATUS
[75] Inventor: Fumihiro Namiki, Kawasaki, Japan
[73] Assignee: Fujitsu Limited, Kawasaki, Japan
[21] Appl. No.: 111,886
[22] Filed: Aug. 26, 1993
[30] Foreign Application Priority Data
  Sep. 3, 1992 [JP] Japan .................................. 4-235988
[51] Int. Cl.⁶ ............................................. G03B 42/02
[52] U.S. Cl. .................................................. 250/586
[58] Field of Search ......................................... 250/586
[56] References Cited
U.S. PATENT DOCUMENTS
4,616,129 10/1986 Yamada et al. ..................... 250/207
4,742,225  5/1988 Chan ................................... 250/586
4,959,545  9/1990 Arakawa et al. .................... 250/586
5,081,356  1/1992 Horikawa ............................ 250/586

Primary Examiner—Constantine Hannaher
Attorney, Agent, or Firm—Staas & Halsey

[57] ABSTRACT

A radiation image reading apparatus for reading radiation images from an accelerated phosphorescence fluorescent material object on which a radiation image of a subject is accumulated and stored and is intended to obtain a radiation image on which radiation image information which is distributed in a wide range of radiation intensity may be displayed with an optimal density (brightness) without deterioration of contrast resolution. The radiation image reading apparatus is provided with a long-range electron multiplier tube having a plurality of photomultipliers or a plurality of secondary electron multiplying parts which are arrayed along a main scanning direction and controls independently respective sensitivities of these photomultipliers.

12 Claims, 19 Drawing Sheets

THORACIC IMAGE

RADIATION IMAGE READING APPARATUS

BACKGROUND OF THE INVENTION

1. Field of the Invention

The present invention relates to a radiation image reading apparatus for reading radiation images from an accelerated phosphorescence fluorescent material object on which radiation images of a subject are accumulated and stored and, more particularly, a radiation image reading apparatus capable of obtaining image signals which carry radiation images with high contrast resolution.

2. Description of the Related Art

Radiation images such as X-ray images have been often used for medical diagnoses. For example, in a case of X-ray images, an X-ray which has transmitted through a subject is irradiated onto a fluorescent material layer (fluorescent screen), then converted to a visible light, and this visible light is irradiated onto a silver halide film to form a latent image and the X-ray image is obtained by developing this silver halide film. The X-ray images thus obtained are used in medical diagnoses. Recently, a system for obtaining high quality reproduced images has been employed by which the X-ray image formed on a silver halide film as described above is read photoelectrically by a so-called film digitizer to obtain image signals and these image signals are image-processed to improve various image characteristics which determine those image qualities such as definition, dynamic range, graininess and others.

Instead of the above described system using silver halide films, a system which uses phosphorescence fluorescent material (accelerated phosphorescence material) has begun to be used. This system using accelerated phosphorescence fluorescent material is intended to accumulate and store an X-ray image on an accelerated phosphorescence fluorescent panel (including a sheet), which is made up by forming accelerated phosphorescence fluorescent material in a shape of panel (or sheet) by irradiating the X-ray which has transmitted through the subject, photoelectrically read this X-ray image to obtain image signals and further obtain a reproduced image after these image signals have been imageprocessed. The basic method of this system is disclosed in the U.S. Pat. No. 3,859,527. For the purpose of this specification, the "accelerated phosphorescence fluorescent material" is a fluorescent material which accumulates therein part of energy of a radiant ray for a while or a long period of time when an radiant ray such as, for example, the X ray, $\alpha$ ray, $\beta$ ray or $\gamma$ ray is irradiated and emits the accumulated energy as an accelerated phosphorescence fluorescent light when an excitation beam such as, for example, infrared radiation, visible light or ultraviolet radiation is irradiated during such accumulation. In this case, a type of radiant ray the energy of which is prone to be accumulated, a wavelength of an excitation beam by which an accelerated phosphorescence fluorescent light is easily emitted and a wavelength of an accelerated. phosphorescence fluorescent light to be emitted differ depending on the type of a fluorescent material to be used.

According to a system using this accelerated phosphorescence fluorescent material, it has been recognized that an energy of radiant ray irradiated onto this accelerated phosphorescence fluorescent material is proportional to a light quantity of the accelerated phosphorescence fluorescent light emitted by irradiation of the excitation beam in a wide range of energy and this ratio of proportion can be changed in accordance with the light quantity of the excitation beam and therefore a radiation image which will not be affected by the variations of the dose of radiant ray can be obtained. In a case of the system for obtaining X-ray images of a human body, the exposure dose to a human body can be reduced in the X-ray radiation photography.

FIG. 17 is an approximate configuration of the conventional radiation image reading apparatus for use in the system employing the accelerated phosphorescence fluorescent material.

In a camera system not shown, a subject is positioned in front of the photography stand, the X-ray generated from the X-ray generator is irradiated to the subject, the X ray which has transmitted through this subject is irradiated onto an accelerated phosphorescence fluorescent panel set on the photography stand and an X-ray image is accumulated and stored on this accelerated phosphorescence fluorescent panel.

After the photography has been carried out as described above, the accelerated phosphorescence fluorescent panel 3_1 is taken out from the photography stand and set on a precision slide 3_7 of the radiation image reading apparatus as shown in FIG. 17. The accelerated phosphorescence fluorescent panel 3_1 set on the precision slide 3_7 is transferred (for sub-scanning), as is being set, in the Y direction shown with an arrowhead by transfer means not shown.

During such transfer (sub-scanning), a laser beam 3_2 as an excitation beam of a wavelength of, for example, 780 nm, emitted from a semiconductor laser 3_4 is repeatedly reflected and deflected by a scanner 3_5 such as, for example, a galvanometer mirror or a rotary polygon mirror and irradiated onto the accelerated phosphorescence fluorescent panel 3_1 after passing through a beam shape correcting optical system 3_6 such as a f$\theta$ lens whereby this accelerated phosphorescence fluorescent panel 3_1 is repeatedly scanned (main scanning) in the X direction shown with an arrowhead by the laser beam 3_2. From respective scanning points are emitted the accelerated phosphorescence fluorescent light which carries the X-ray image which is accumulated and stored on the accelerated phosphorescence fluorescent panel 3_1. This accelerated phosphorescence fluorescent light is condensed by a condenser 3_8, led to a photomultiplier tube 3_9 through an optical filter (not shown) which cuts off the excitation beam and simultaneously admits the accelerated phosphorescence fluorescent light, and converted to electric signals.

FIGS. 18 and 19 are respectively an approximate perspective view of a light guide passage (condensing member) to be employed in the conventional radiation image reading apparatus. This light guide passage (condensing member) is used for guiding the accelerated phosphorescence fluorescent light which is linearly generated along the main scanning line to a single photomultiplier tube having a circular photoelectric surface. FIG. 18 shows a bundle type light guide passage made up by binding a number of optical fibers and FIG. 19 shows a light guiding sheet which is formed in the shape of a dustpan by deforming an acryl sheet, which is disclosed in the patent application Disclosure No. 87970-1980.

Electric signals obtained from the photomultiplier tube 3_9 shown in FIG. 17 are amplified by an initial stage amplifier 3_10 to an optimal signal level to an A/D converter 3_11, then converted to digital image signals by the A/D converter 3_11. These digitized image signals are stored in an image memory 3_12. After this, these image signals are converted to the display brightness signals and displayed on a CRT unit not shown and outputted to a film as a hard copy.

For example, in the case of X-ray photography of the thoracic region of a human body, a transmission ratio of the X ray through the lungfield region and parts near the skin is large and that through the mediastinal region including the backbone and the heart is small. Therefore, there has been a problem that, if the photography is carried out under the X-ray irradiating condition that the lungfield region is photographed with an optimal density, the photographic density of the mediastinal region is insufficient and, if the photography is carried out so that the mediastinal region is photographed with an optimal density, the photographic density of the lungfield region is excessive.

To solve this problem, the conventional system using silver halide films has used films each having a small slope of the gamma curve (X-ray dose to photographic density curve) in photography so that the lungfield region and the mediastinal region could be displayed with an optimal density. In this case, there has been another problem that the contrast resolution would deteriorate.

As another conventional method for solving the problem, a photographic technique for varying the intensity of the X ray in the X-ray irradiation field thereof has been invented to irradiate a reduced dose of X ray to a region of a human body such as the lungfield region where an X-ray transmission ratio is large and, on the contrary, an increased dose of X ray, to the mediastinal region. Specifically, X-ray photography in this case is conducted by setting an additional filter, which is made of aluminium for damping the dose of X ray and formed to be thick at a part corresponding to the lungfield region and to be thin at a part corresponding to the mediastinal region, between the X-ray tube and the subject. This method has encountered a problem that the shape of this additional filter need be changed in accordance with the size (physical feature) of the subject and therefore the work is complicated.

On the other hand, in a case of a system using accelerated phosphorescence fluorescent material, there has been a problem that the density resolution would deteriorate in A/D conversion of signals which carry images in a wide range of density, although the accelerated phosphorescence fluorescent material itself yields a wide latitude, and the range of brightness which can be displayed on the CRT screen is small in reproduction display of images on the CRT display unit and therefore the contrast resolution would deteriorate in simultaneous display of a physical region where the dose of X ray transmitting X ray is extremely large and a physical region where the dose of X ray is small on the same display system.

The above problem in the system using the accelerated phosphorescence fluorescent material is further described in detail below.

FIGS. 20, 21(A) and (B), 22, and 23 respectively show a radiation image (FIG. 20) carried by image signals obtained from reading by the radiation image reading apparatus shown in FIG. 17, for example, in the radiation photography of the thoracic region in the system using accelerated phosphorescence fluorescent material, a waveform of image signal (FIGS. 21(A) and (B)) along scanning lines 1 and 2 shown in FIG. 20, a histogram Of image signal values (X-ray intensity) (FIG. 22), and a display gradation curve (FIG. 23).

A curve of variations of an image signal value obtained along scanning lines 1 and 2 with respect to a thoracic image as shown in FIG. 20 indicates that the image signal value largely varies at a region of the subject, for example, as shown in FIG. 21. A histogram obtained with respect to the image as a whole as shown in FIG. 20 indicates that the histogram distributes in a wide range of radiation intensity, for example, as shown in FIG. 22. If the image is displayed using a display gradation curve A shown in FIG. 23 when a histogram showing such wide range of distribution is obtained, an image including both the lungfield region and the mediastinal region can be displayed. However, a problem of unsatisfactory contrast resolution will occur since the gradient of the gradation curve A is small. In the case of the gradation curve B, the image of the lungfield region is displayed with satisfactory contrast resolution but the mediastinal region cannot be displayed. In the case of the gradation curve C, the mediastinal region can be displayed with satisfactory contrast resolution but the lungfield region cannot be displayed.

SUMMARY OF THE INVENTION

An object of the present invention is to solve the above described problems by providing a radiation image reading apparatus capable of obtaining image signals with which radiation image information distributed in a wide range of radiation intensity is displayed in an optimal density (brightness) without deterioration of the contrast resolution in the system using accelerated phosphorescence fluorescent material.

The first radiation image reading apparatus according to the present invention, which attains the above described object, comprises main scanning means for repeatedly scanning with an excitation beam an accelerated phosphorescence fluorescent object on which a radiation image of a subject is accumulated and stored in the main scanning direction, sub-scanning means for relatively moving the accelerated phosphorescence fluorescent object or the excitation beam in the sub-scanning direction, and photoelectric conversion means for receiving the accelerated phosphorescence fluorescent light emitted from respective scanning points by the excitation beam and obtaining image signals which carry the radiation image, is characterized in that said photo electric conversion means is provided with a plurality of photomultipliers and a control section for independently controlling respective sensitivities of the plurality of photomultipliers.

This first radiation image reading apparatus may be provided with an adder for adding to one another respective output signals of the plurality of photomultipliers and the above described control section may be adapted to control respective sensitivities of the plurality of photomultipliers independently based on the output signals of the adder, or the above described control section can be adapted to independently control respective sensitivities of corresponding photomultipliers based on respective output signals of the above described plurality of photomultipliers. In any case, the above described control section is preferably adapted to control respective sensitivities of the plurality of photomultipliers so that the intensities of output signals of the plurality of photomultipliers approximately coincide with the preset intensity.

The second radiation image reading apparatus according to the present invention made to attain the above described object, comprising main scanning means for repeatedly scanning with an excitation beam an accelerated phosphorescence fluorescent object on which a radiation image of a subject is accumulated and stored in the main scanning direction, sub-scanning means for relatively moving the accelerated phosphorescence fluorescent object or the excitation beam in the sub-scanning direction, and photoelectric conversion means for receiving the accelerated phosphorescence fluorescent light emitted from respective scanning points by the excitation beam and obtaining image signals which carry the radiation image, is characterized in that the photoelectric conversion means is provided with a long-range photomultiplier tube having a long-range photoelectric surface arranged to extend along the main scanning direction and a plurality of secondary electron multiplying parts arranged along the lengthwise direction of the photoelectric surface and a control section for independently controlling respective sensitivities of the above plurality of secondary electron multiplying parts.

The second radiation image reading apparatus may also be provided with a signal adder for adding to one another respective output signals of the above described plurality of secondary electron multiplying parts and the control section may be adapted to independently control respective sensitivities of the plurality of secondary electron multiplying parts based on the output signals from the above described signal adder, or the above described control section may be adapted to independently control respective sensitivities of corresponding secondary multiplying parts based on the output signals of the above described plurality of secondary electron multiplying parts, In any case, the control section is preferably configured to control respective sensitivities of a plurality of secondary electron multiplying parts so that the intensities of output signals of the plurality of secondary electron multiplying parts approximately coincide with the preset signal intensity.

The radiation image reading apparatus according to the present invention is provided with a plurality of photomultipliers arrayed along the main scanning direction and configured to independently control respective sensitivities of a plurality of photomultipliers so that, for example, the intensities of output signals of the plurality of photomultipliers approximately coincide with the preset intensities of signals and, therefore, the image signals with those values which are approximate to one another can be obtained from, for example, the mediastinal region where the dose of transmitting radiation is reduced and the lungfield region where the dose of transmitting radiation is increased. Accordingly, the radiation image information which is distributed in a wide range of radiation intensity can be displayed based on the image signals as described above without deterioration of the contrast resolution.

Thus, the radiation image reading apparatus according to the present invention is provided with a long-range electron multiplying tube having a plurality of photomultipliers arrayed along the main scanning direction or a plurality of secondary electron multiplying parts and adapted to independently control the sensitivities of respective photomultipliers and therefore the radiation image reading apparatus of the present invention is enabled to obtain image signals suited to display radiation image information, which is distributed in a wide range of intensity, with satisfactory contrast resolution.

DESCRIPTION OF THE PREFERRED EMBODIMENTS

The embodiments of the present invention are described below.

Figure 1:
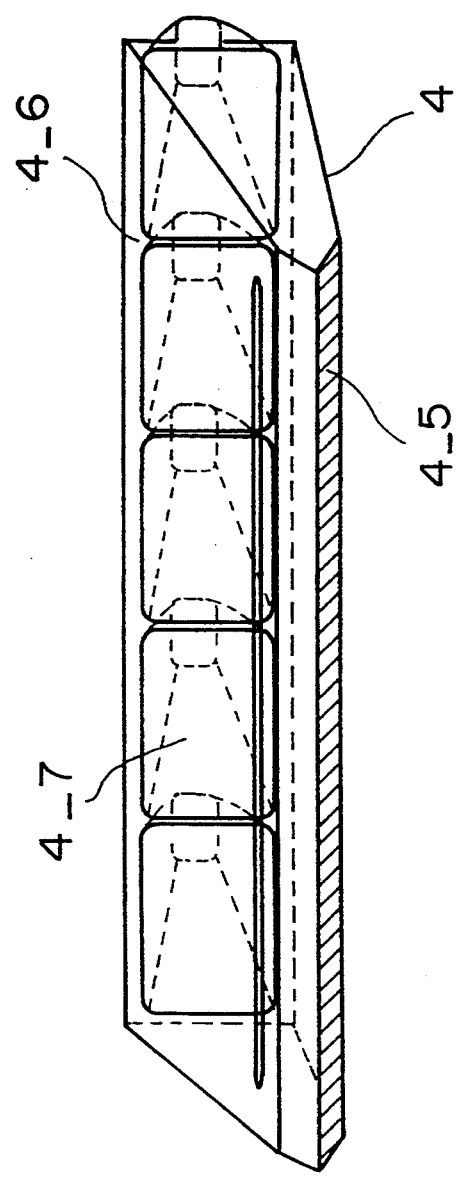
FIG. 1 is a perspective view showing a reading mechanism to be used in a radiation image reading apparatus according to an embodiment of the present invention.
Figure 2:
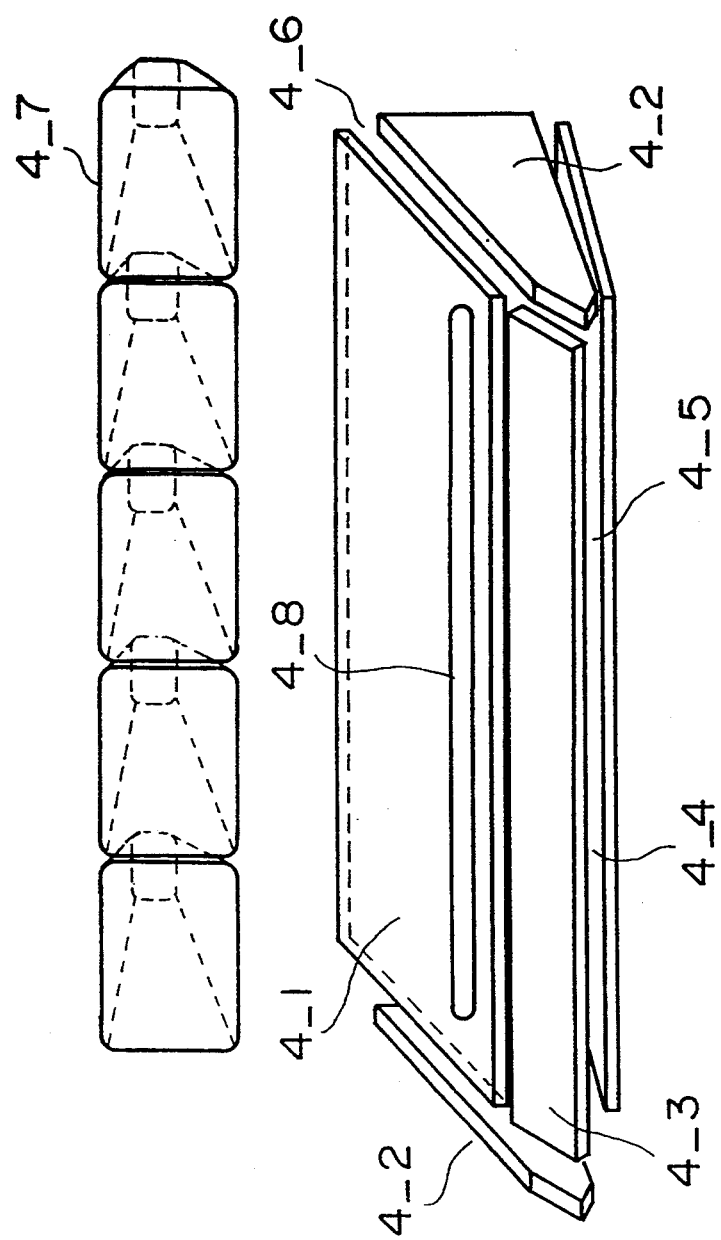
FIG. 2 is a disassembled perspective view showing a reading mechanism to be used in a radiation image reading apparatus according to an embodiment of the present invention, FIGS. 3(A) and (B) are respectively a plan view and a side view showing a reading mechanism to be used in a radiation image reading apparatus according to an embodiment of the present invention.

FIGS. 1, 2 and 3(A) and (B) are respectively a perspective view, a disassembled perspective view, a plan view and a side view showing a reading mechanism to be used in a radiation image reading apparatus in accordance with an embodiment of the present invention.

Figure 3:
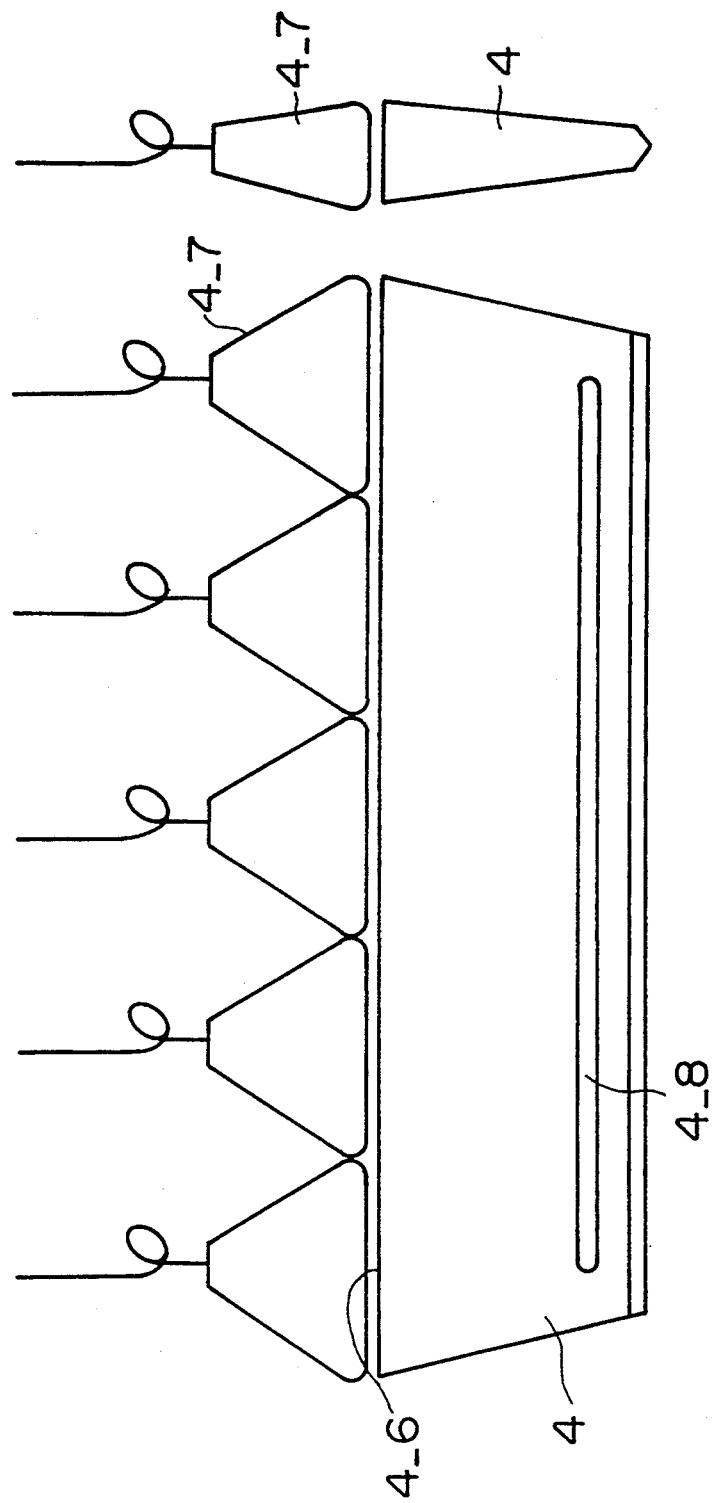
Figure 4:
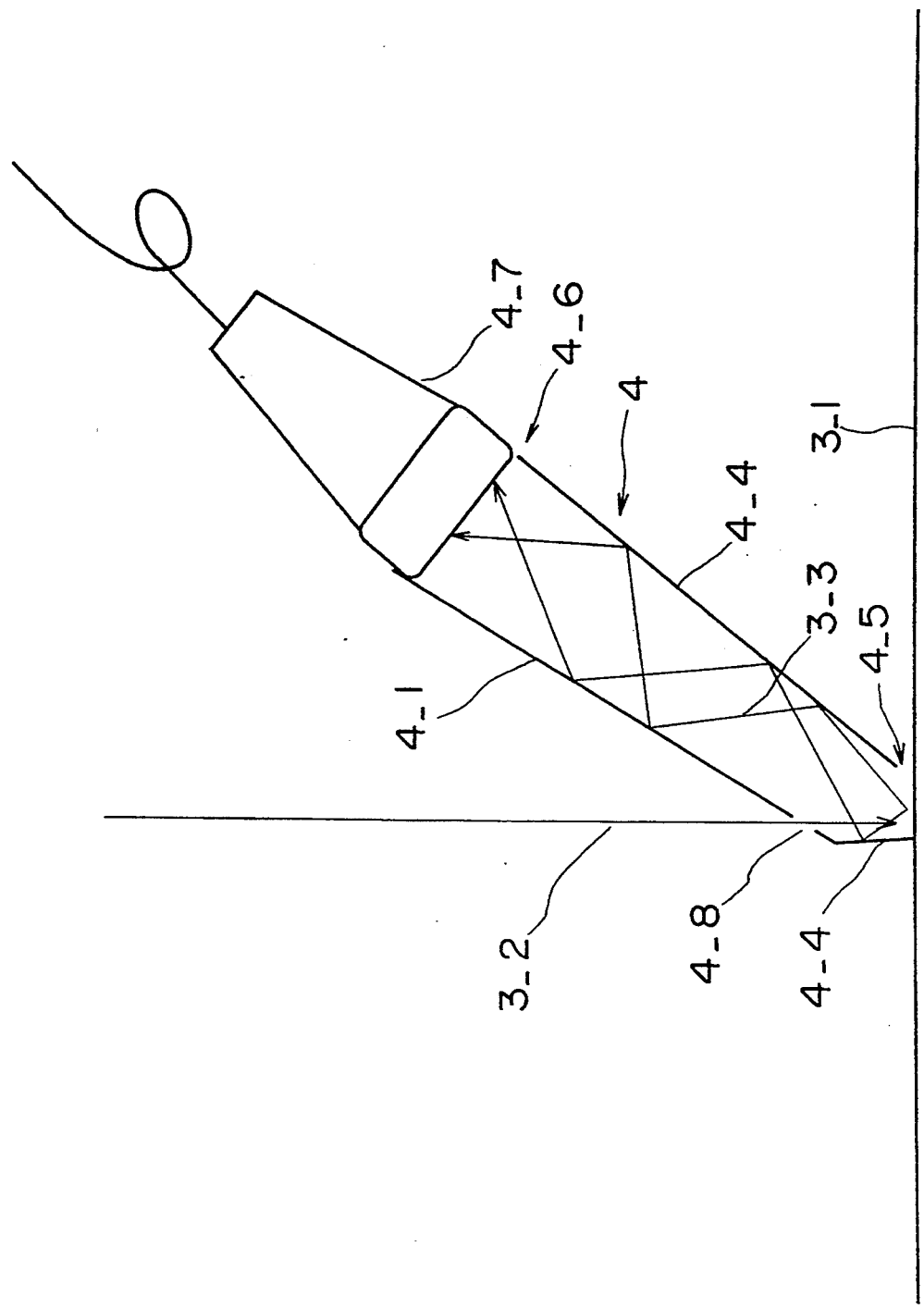
FIG. 4 is a typical diagram showing a reading mode using the reading mechanism shown in FIGS. 1, 2 and 3(A) and (B)

FIG. 4 is a typical diagram showing a reading mode in the case that the reading mechanism shown in FIGS. 1 to 3 is used.

A condensing member 4 which forms this reading mechanism is made up with five metal plates 4_1, 4_2, 4_3 and 4_4 of which internal surfaces are mirror-finished, and a slit 4_8 for passing the scanning laser beam is formed in the metal plate 4_1 of these metal plates 4_1, 4_2, 4_3 and 4_4. The accelerated phosphorescence fluorescent light 3_3 emitted from the accelerated phosphorescence fluorescent panel by irradiating the laser beam 3_2 to the accelerated phosphorescence fluorescent panel 3_1 (refer to FIG. 4) enters into the condensing member 4 through the incidence port 4_5 and further into a plurality of photomultipliers 4_7 (five photomultipliers in this example) provided at the exit port 4_6 of the condensing member 4 while reflection in this condensing member 4 is repeated.

The internal space of the condensing member 4 is constructed to be gradually expanded from the incidence port 4_5 toward the exit port 4_6. In other words, the area of the exit port 4_6 is larger than that of the incidence port 4_5 and the length of the exit port 4_6 in the main scanning direction and that in a direction intersecting at right angles to the main scanning direction are longer than the length of the incidence port 4_5 in the main scanning direction (horizontal direction in FIG. 3(A)) and that in a direction intersecting at right angles to the main scanning direction. A plurality of photomultipliers, which have the total area of their photoelectric surfaces is larger than the area of the incidence port 4_6, are closely arranged at the exit port 4_6.

The reading mechanism as described above permits optionally and independently varying the sensitivity of a photomultiplier corresponding to the scanning position of the excitation beam. For example, the sensitivity of the photomultiplier, which largely contributes to photoelectric conversion of the accelerated phosphorescence fluorescent light therefrom, can be set at a reduced value when the laser beam 3_2 is scanning a position corresponding to a region such as the lungfield region where the radiation transmission ratio is large. In another example, the sensitivity of the photomultiplier, which largely contributes to photoelectric conversion of the accelerated phosphorescence fluorescent light therefrom, can be set at an increased value when the laser beam 3_2 is scanning a position corresponding to a region such as the mediastinal region where the radiation transmission ratio is small.

Figures 5A, 5B:
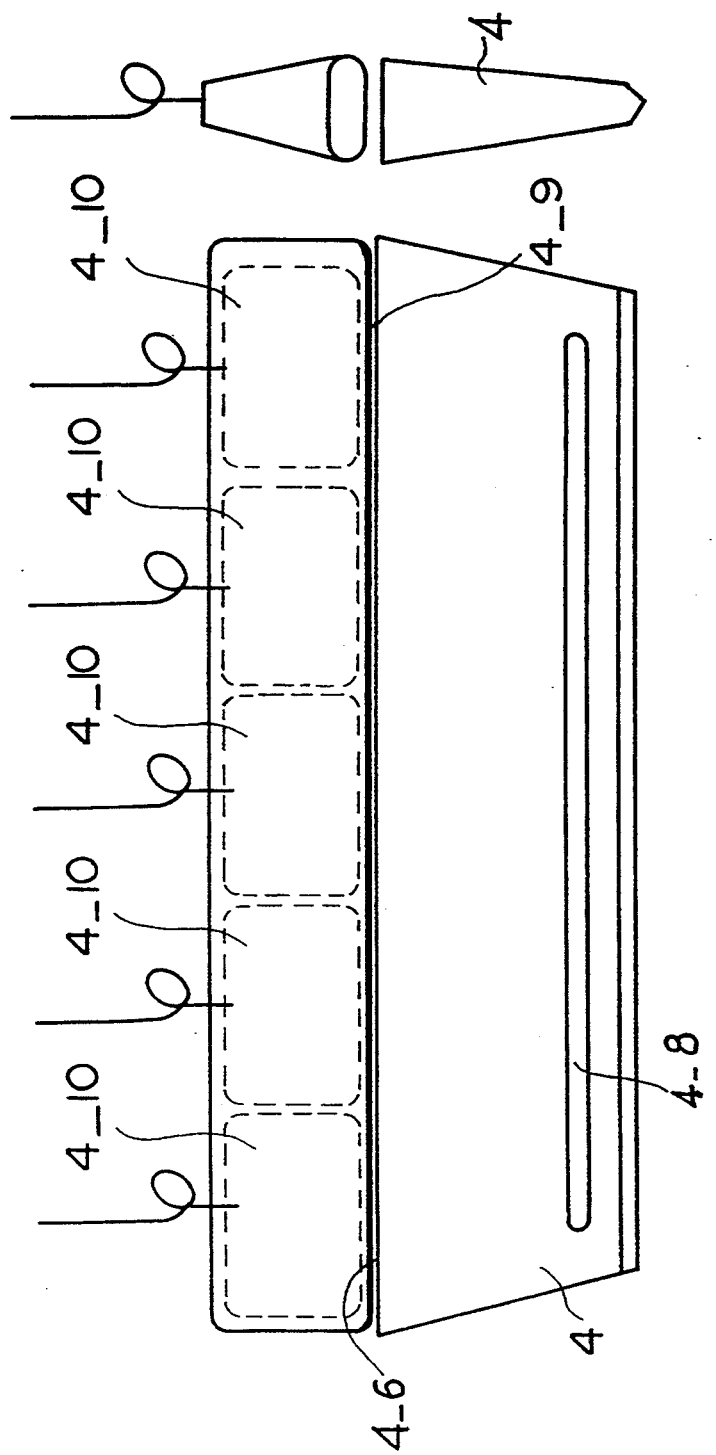
FIG. 5(A)–(B) is a plan view showing another embodiment which can be used in the present invention.

Thus, the accumulated radiation energy which is distributed in a wide range of intensity can be compressed to an image signal which has the distribution in a narrow range of intensity. FIGS. 5(A) and (B) are respectively a plan view and a side view showing another example of the reading mechanism which can be used for the purpose of the present invention.

The condenser 4 for use in this reading mechanism is formed to be similar to the above described reading mechanism (refer to FIGS. 1 to 4) and, at its exit port 4_6, a long-range photomultiplier tube which has a single long-range photoelectric surface 4_9 and a plurality of secondary electron multiplying parts 4_10 as shown in FIG. 5(A). A plurality of photomultipliers need not be provided and it is satisfactory if a plurality of structures for which the sensitivity can be independently set are provided in the main scanning direction. The condenser 4 for use in the above respective reading mechanisms is formed with metal plates 4_1, 4_2, 4_3 and 4_4 and, in addition to the metal plates, those materials such as glass plate and acryl plate on which a reflection surface is formed by a thin film developing technology such as plating, vacuum evaporation, sputtering, ion plating or the like can be used. In addition, a dichroic mirror can be formed by depositing dielectric material such as ZnS and Na$_3$AlF$_6$ and/or thin metal film in a plural number of layers as a reflection surface on the metal plate, glass plate or acryl plate thereby the reflection factor of wavelength of the accelerated phosphorescence fluorescent light in this case can be increased and the reflection factor of the laser beam can be reduced.

Figure 6:
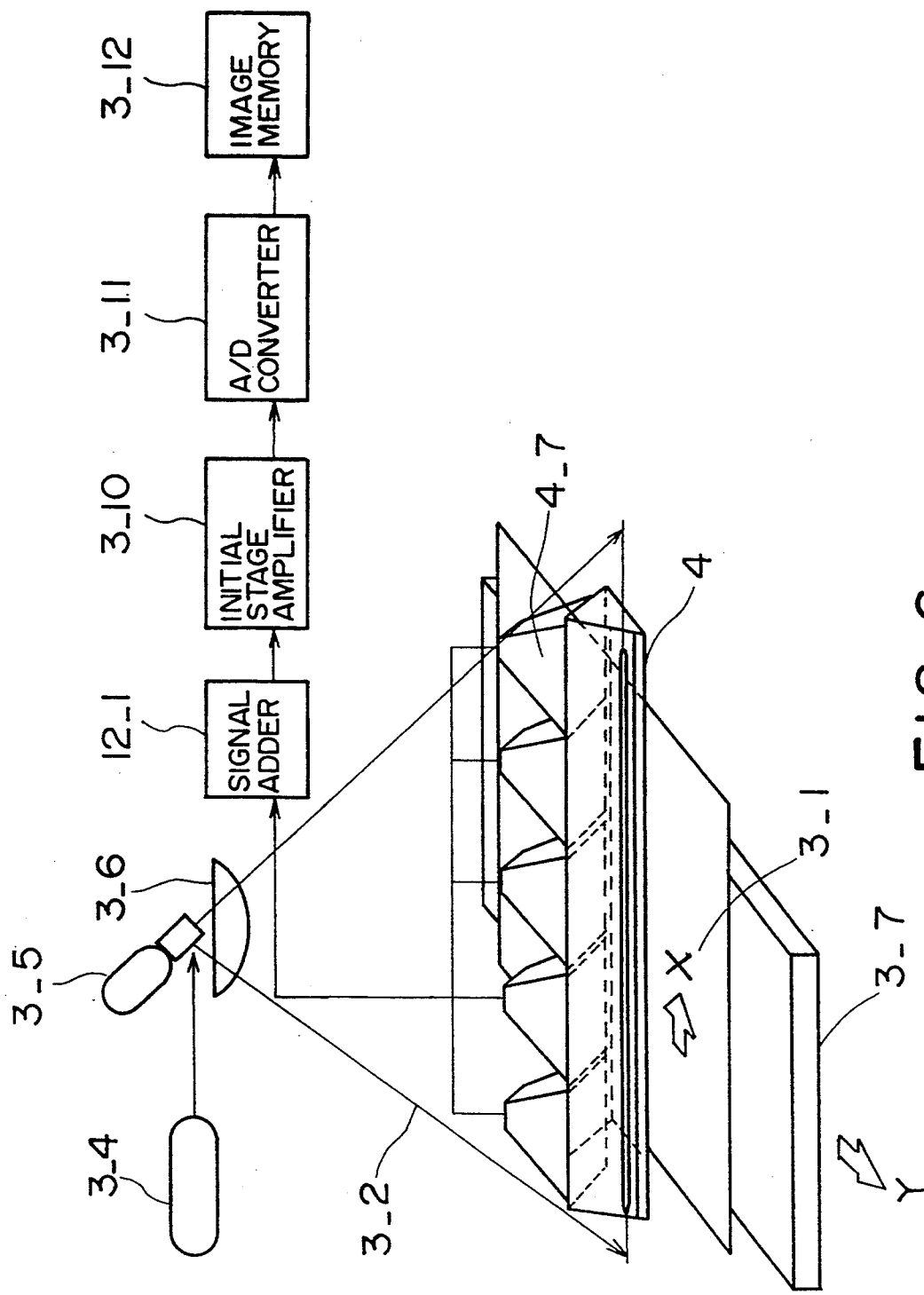
FIG. 6 is an approximate configuration diagram representing an embodiment of a radiation image reading apparatus according to the present invention.

FIG. 6 is an approximate configuration of an embodiment of the radiation image reading apparatus according to the present invention.

Figure 17:
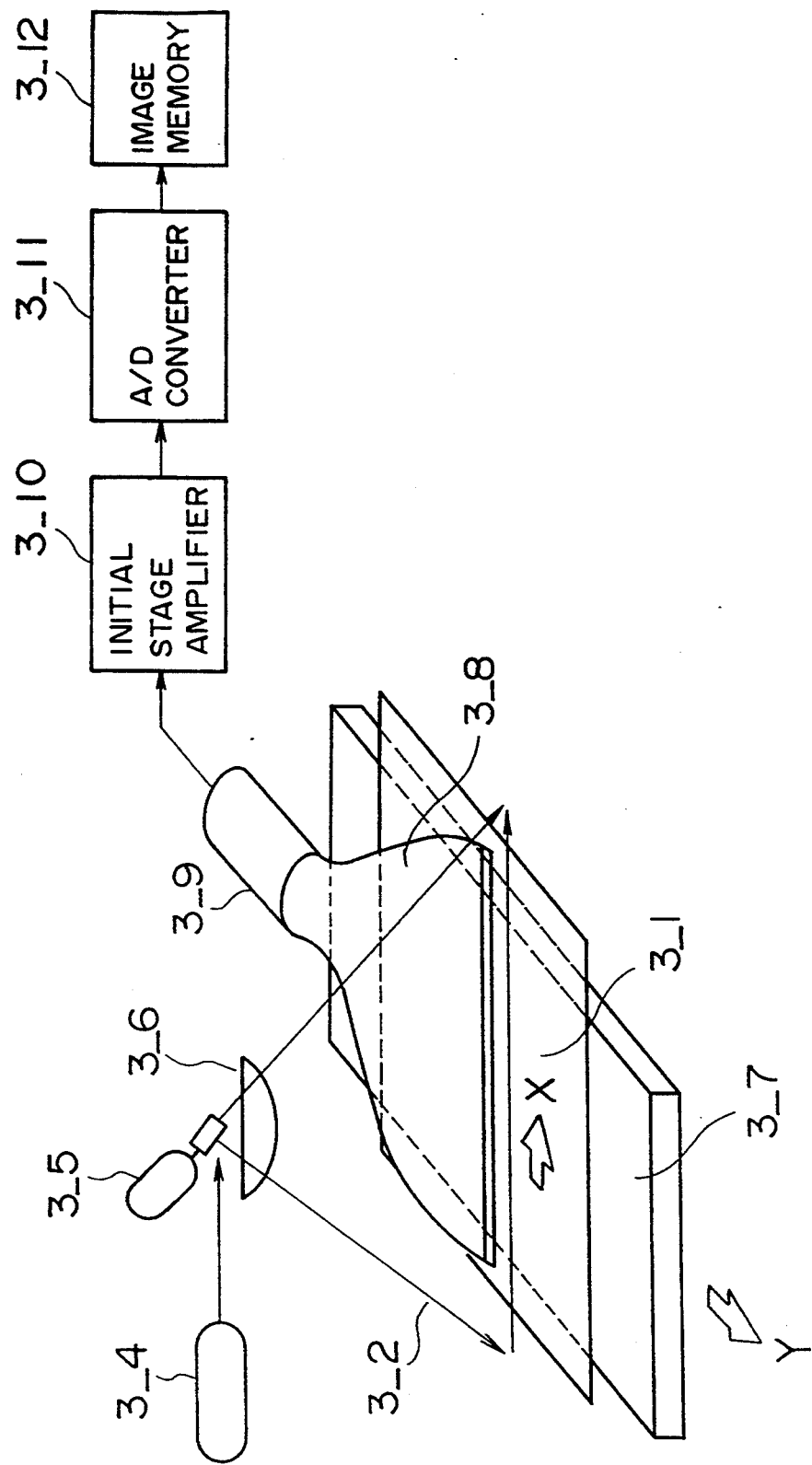
FIG. 17 is an approximate configuration diagram of the conventional radiation image reading apparatus for use in a system using an accelerated phosphorescence fluorescent light.
Figure 18:
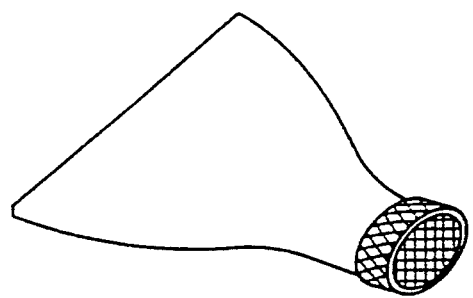
FIG. 18 is an approximate perspective view showing an example of a light guide passage (condensing member) to be used in the conventional radiation image reading apparatus.
Figure 19:
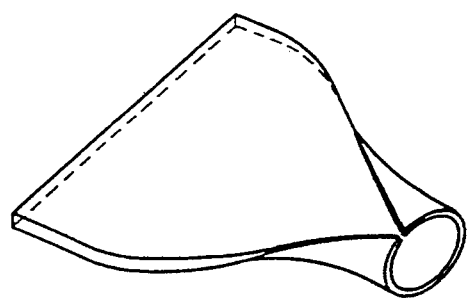
FIG. 19 is an approximate perspective view showing another example of a light guide passage (condensing member) to be used in the conventional radiation image reading apparatus.

Those components corresponding to the components of the conventional radiation image reading apparatus shown in FIG. 17 are given the same numbers as given in FIG. 17, and only different points are described below.

The radiation image reading apparatus shown in FIG. 6 is provided with a reading mechanism shown in FIGS. 1~4, and received light signals of respective photomultipliers 4_7 are added to one another by the signal adder 12_1, then entered into the initial stage amplifier 3_10. In FIG. 6, an example of arrangement of five photomultipliers 4_7 is shown and the number of photomultipliers 4_7 is not, of course, limited to five photomultipliers.

Figure 7:
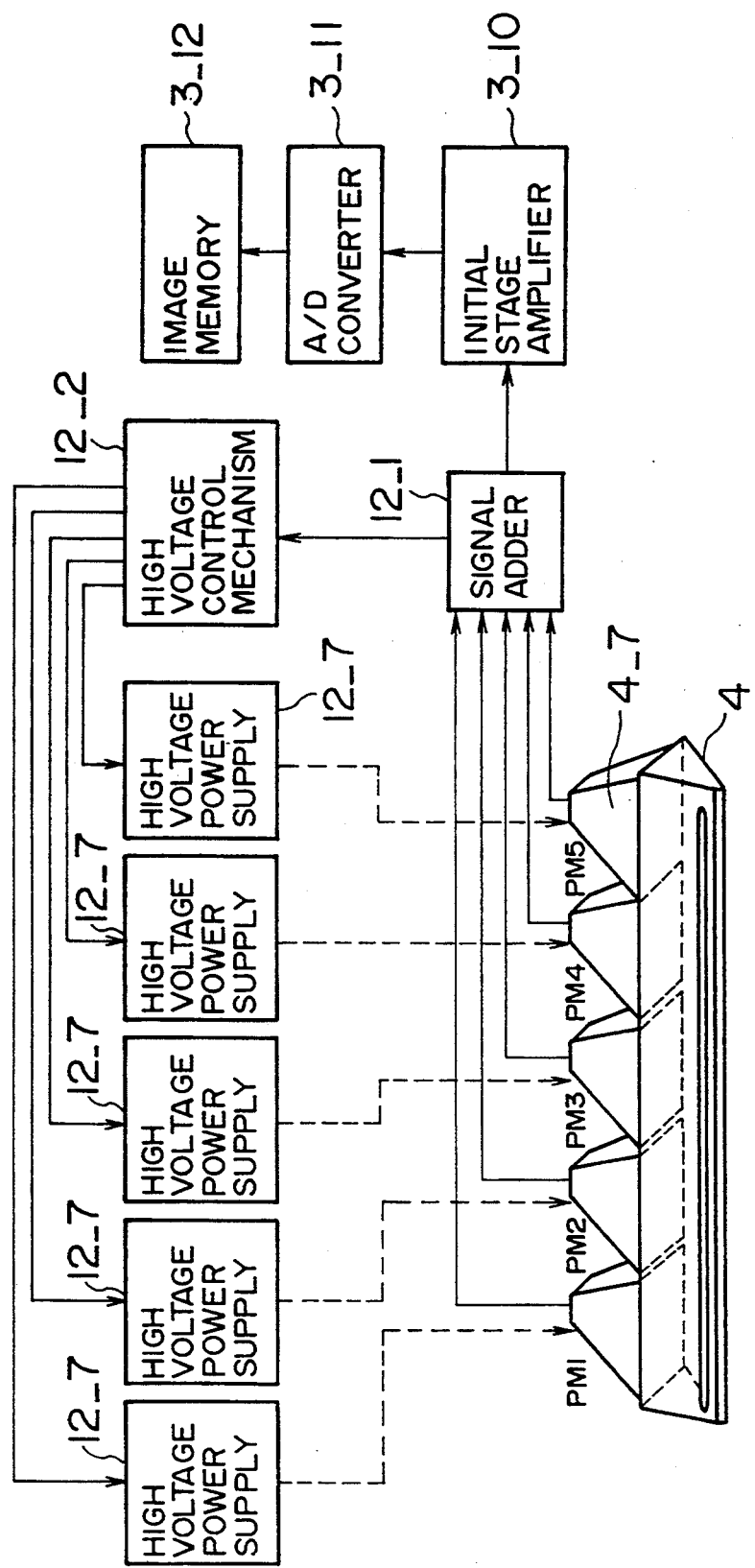
FIG. 7 is a diagram showing a method for controlling the sensitivities of individual photomultipliers for use in a radiation image reading apparatus shown in FIG. 6.

FIG. 7 shows a method for controlling the sensitivity of individual photomultipliers for use in the radiation image reading apparatus shown in FIG. 6.

Output signals from photomultipliers PM1~PM5 are changed to a single composite signal by the signal adder 12_1 as described above. Specifically, the accelerated phosphorescence fluorescent light emitted in sequence by scanning with the excitation laser beam is received and synthesized as a large signal by the nearest photomultiplier and as a small signal by the remote photomultiplier and therefore continuous time series signals are obtained by synthesizing these signals in the signal adder 12_1.

A signal synthesized by the signal adder 12_1 is amplified by the initial amplifier 3_10 to an optimal signal level to the A/D converter 3_11, converted to a digital image signal by the A/D converter 3_11 and stored in the image memory 3_12. Simultaneously, the signal synthesized by the signal adder 3_12 is entered also into a high voltage control mechanism 12_2. The high voltage control mechanism 12_2 controls the output voltage of a high voltage power supply 12_7 provided for photomultipliers PM1~PM5.

Figure 8:
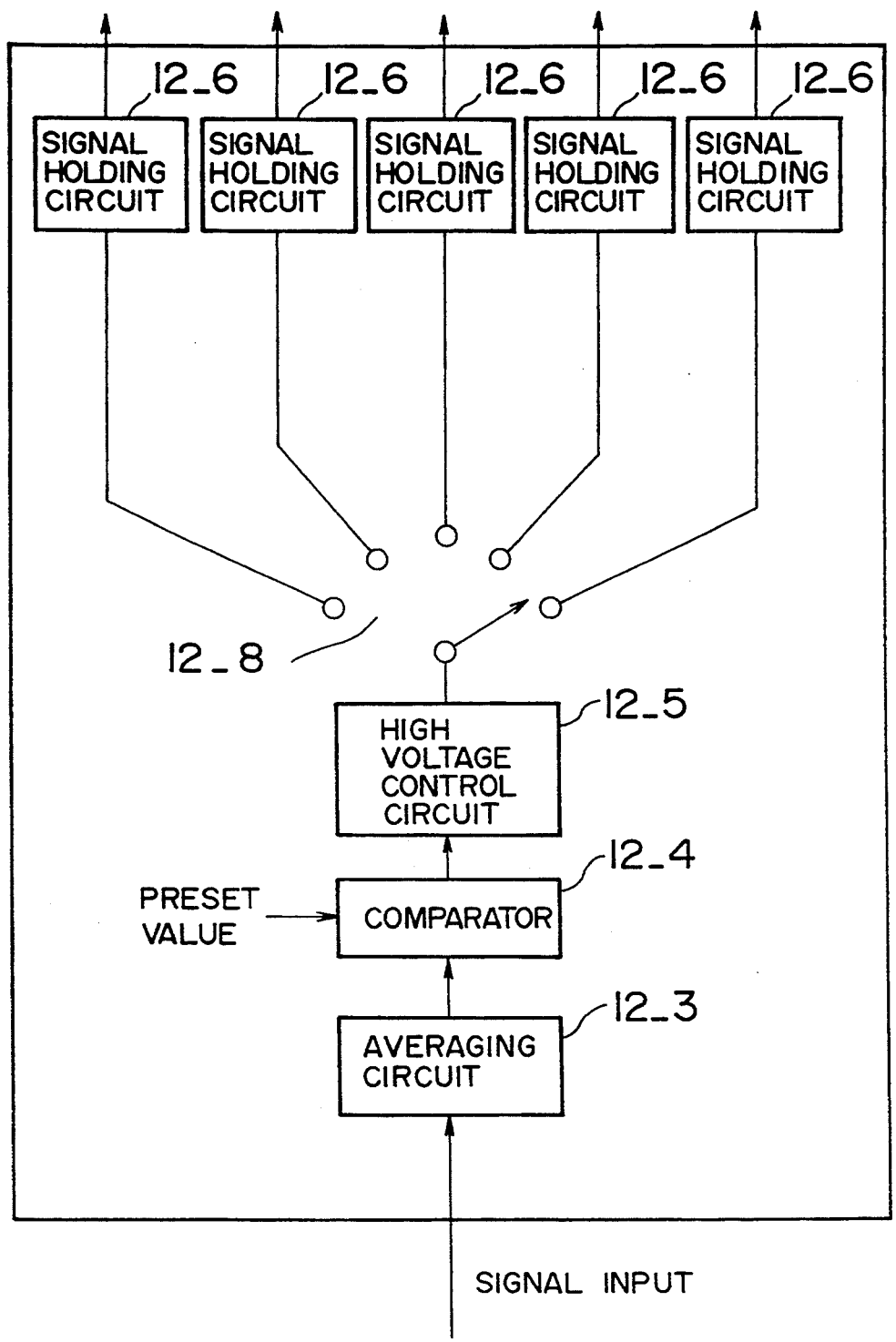
FIG. 8 is an internal block diagram of a high voltage control mechanism shown in FIG. 7.

FIG. 8 is an internal block diagram of the high voltage control mechanism shown in FIG. 17.

Signals from the signal adder 12_1 are entered into an averaging circuit 12_3. The averaging circuit 12_3 outputs a mean value for every 1/5 (a reciprocal of the number of photomultipliers) of one scanning time. This mean value is entered into the comparator 12_4 and compared with the preset value. The high voltage circuit 12_5 is controlled so that an applied voltage to the photomultiplier is reduced if the mean value from the averaging circuit 12_3 is larger than the preset value, and increased if the mean value is smaller than the preset value. The high voltage control circuit 12_5 generates in sequence a signal for controlling the output voltage of the high voltage power supply 12_7 (refer to FIG. 7) whenever the mean value is outputted from the averaging circuit 12_3. This control signal is sent to the high voltage power supply 12_7 through a changeover switch 12)8 and further a signal holding circuit 12_6 corresponding to the photomultiplier. The signal holding circuit 12_6 is intended to hold the previous control signal until a next new control signal is entered.

As described above, the sensitivities of the photomultipliers can be controlled by controlling the voltages to be applied to respective photomultipliers so that an average signal level outputted from respective photomultipliers is consequently always kept constant.

A method for controlling the sensitivities of the photomultipliers shown in FIGS. 7 and 8 is described in detail below.

Figure 9:
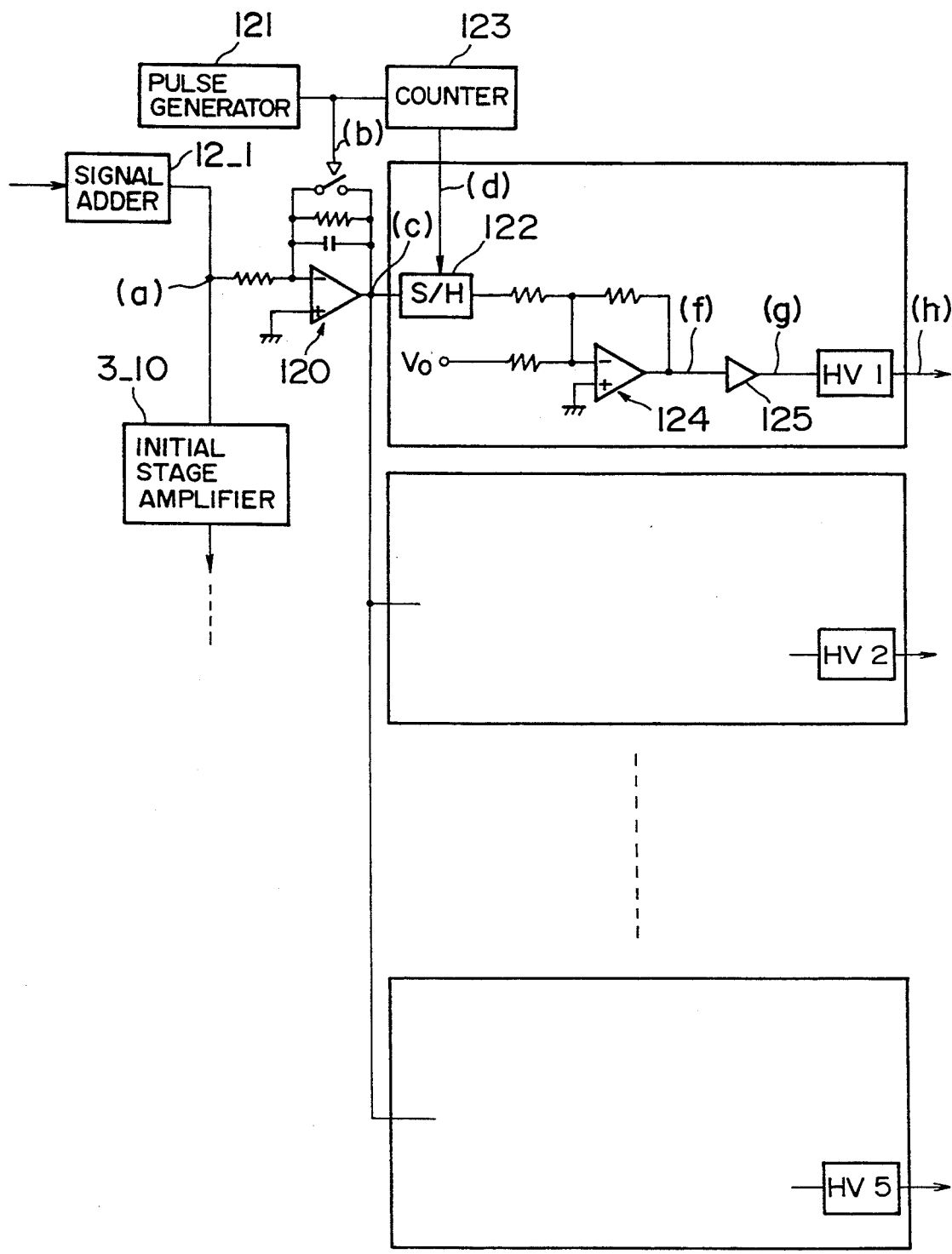
FIG. 9 is a diagram showing an example of a signal processing circuit.
Figure 10:
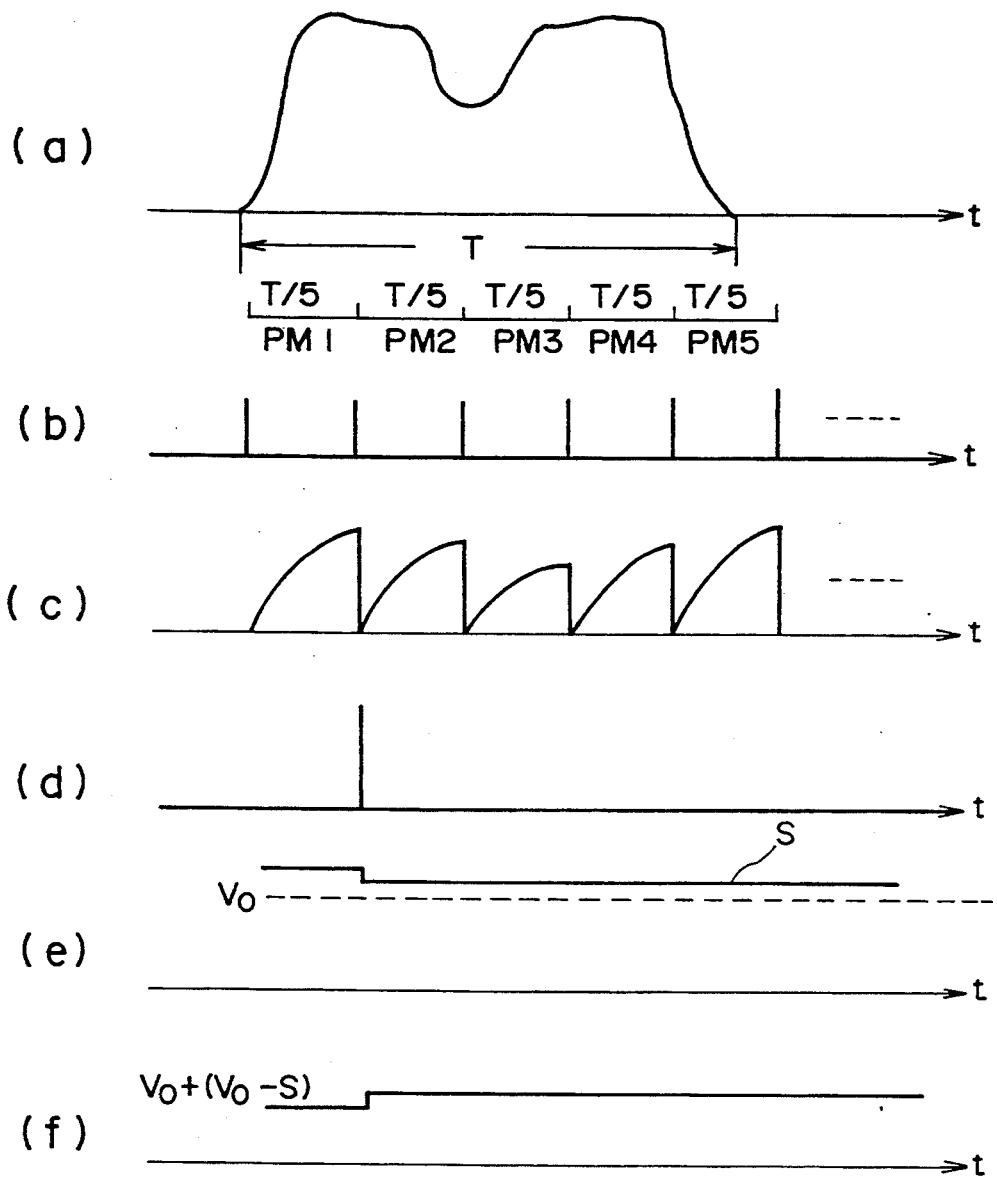
FIG. 10 is a diagram showing an example of a signal waveform at each node of the signal processing circuit shown in FIG. 19.

FIG. 9 shows an example of the signal processing circuit of this embodiment and FIG. 10 shows an example of signal waveform obtained at each node of the signal processing circuit shown in FIG. 9.

Figure 11:
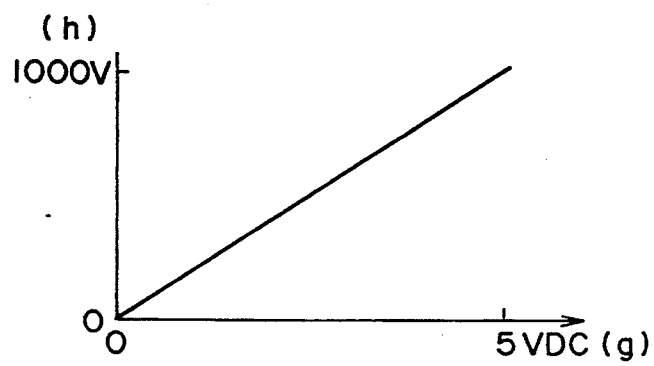
FIG. 11 is a graph showing the relationship between the control voltage and the high voltage output of the high voltage power supply for photomultipliers.

Output signals from five photomultipliers are analogically added by the signal adder 12_1 and entered into an integrator 120 as time series signals corresponding to the scanning time T of one line as shown in (a). A refresh signal (b) generated at a T/5 time interval is sent from a pulse generator 121 to the integrator 120 to carry out integration of signals with a time interval (a) for pulses and an integration output of (c) is obtained. A sample hold signal (d) is entered into a sample hold circuit 122 and a value of integration output at that timing is held. The sample hold signal (d) is an output when the refresh signal (b) is counted 5 times by the counter 123 and generated once for every five refresh signals (b). A sample-held signal (e) is entered into the comparator 124 and compared with the reference voltage $V_0$. The reference voltage $V_0$ is a desired average voltage of signal and, for example, a voltage suitable to the input range of the A/D converter to be used (3_11 in FIG. 7). (Usually, this voltage is set to a voltage corresponding to 80~90% of the maximum input voltage of the A/D converter). Where the sample-held signal (e) is S and the reference voltage is $V_0$, the comparator 124 outputs a signal (f) equal to $V_0+(V_0-S)$.

Where the relationship between a control voltage (g) for the high voltage power supply (HV in the drawing) for photomultipliers to be used and a high voltage output (h) is as shown in FIG. 11, the output signal (f) from the comparator 124 is converted by an amplifier 125 so that this output signal has a level within the range (0~5V in this case) of the control voltage for the high voltage power supply for photomultipliers.

Those sample-held signals (e) corresponding to the output signals of photomultipliers can be obtained by using the circuits of the above described type as many as the number of photomultipliers (5 photomultipliers) prepared to shift in sequence the timing of generation of sample-held signals (e).

The circuit configuration as described above permits to implement such control as to reduce the output of the high voltage power supply and also the multiplication ratio of the photomultiplier when an integration value (mean value) corresponding to the output signal of the photomultiplier is larger than the reference voltage.

As another embodiment, instead of entering the output off the signal adder 121 into the integrator 120 as described above, an integrator can be provided corresponding to each photomultiplier and an output signal from each photomultiplier before entering into the signal adder 12_1 can be entered into each integrator.

Figure 12:
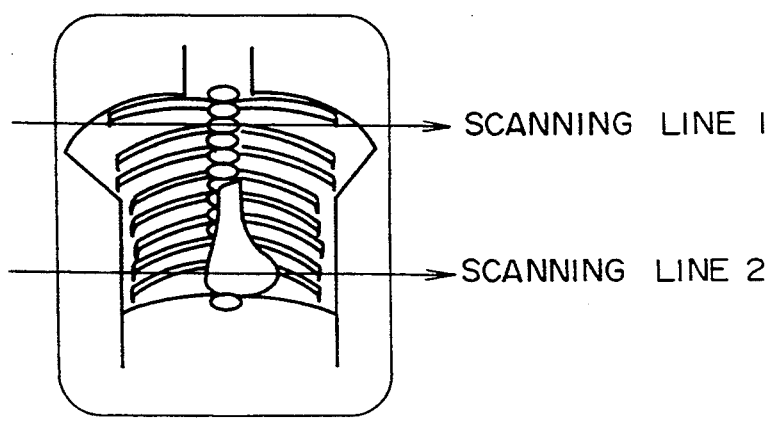
FIG. 12 is a diagram showing a thoracic image obtained from reading by the radiation image reading apparatus shown in FIG. 6, as shown in FIG. 20 in a conventional example.
Figure 13:
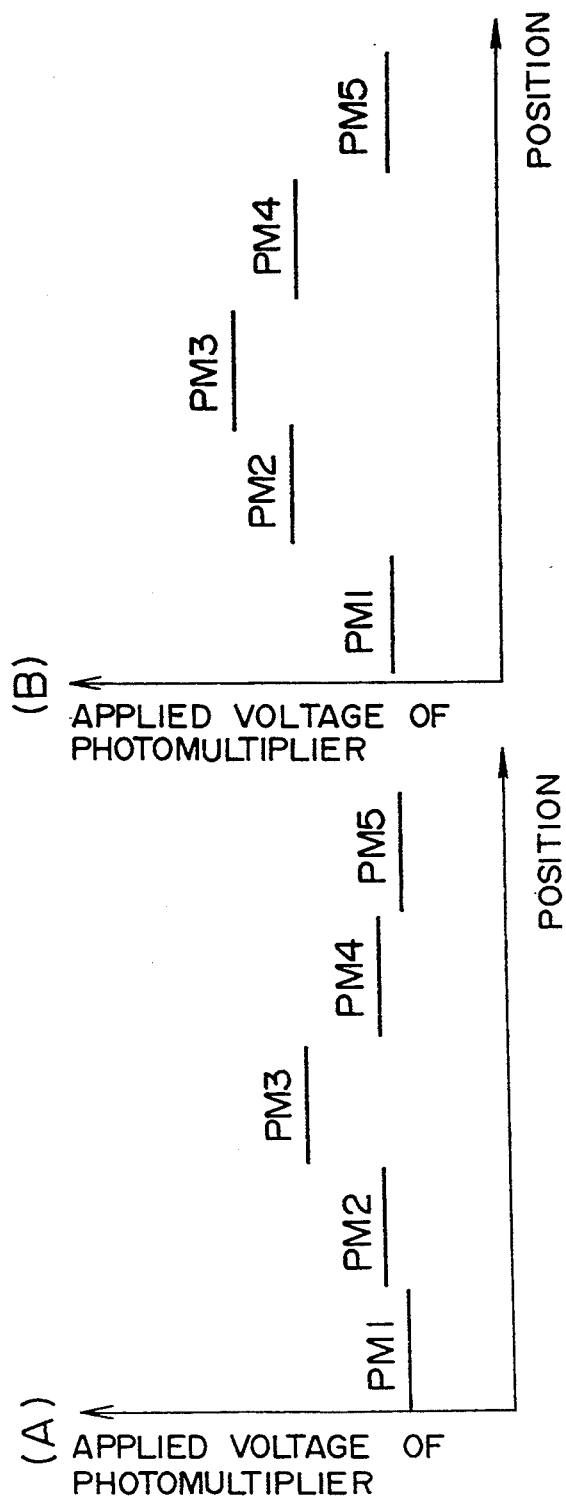
FIGS. 13(A) and 13(B) are respectively a diagram showing a voltage to be applied to five photomultipliers in scanning lines 1 and 2 shown in FIG. 12, FIGS. 14(A) and 14(B) are respectively a waveform of signal synthesized by the signal adder in scanning lines 1 and 2.
Figure 14:
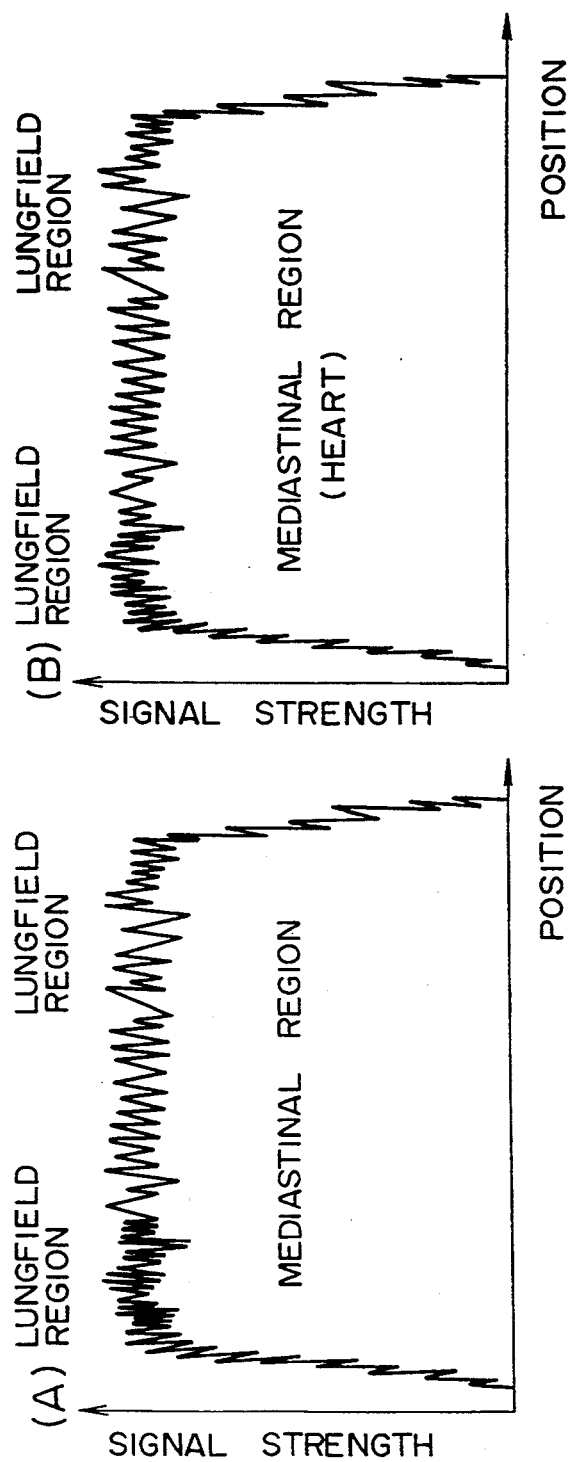
Figure 15:
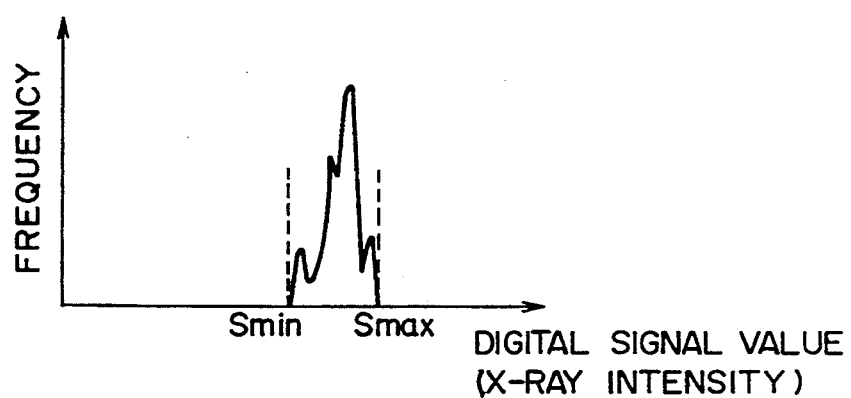
FIG. 15 is a diagram representing a histogram of image signal values of the whole image shown in FIG. 12.
Figure 20:
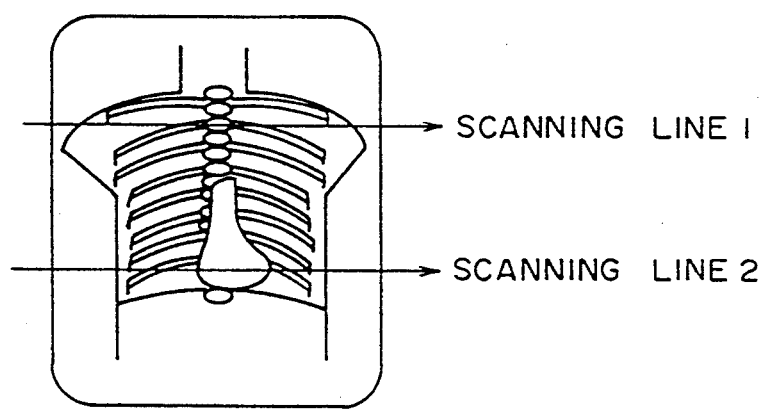
FIG. 20 is a diagram representing a radiation image which carries image signals obtained from reading by the radiation image reading apparatus shown in FIG. 17, FIGS. 21(A) and 21(B) are respectively a diagram representing the image signal waveform along scanning lines 1 and 2 shown in FIG. 20.

FIG. 12 shows an image of the thoracic region which is obtained from reading by the radiation image reader shown in FIG. 6 and similar to FIG. 20 in he example of the prior art, FIGS. 13(A) and (B) respectively show a voltage to be applied to five photomultipliers PM1~PM5 in the scanning lines 1 and 2 shown in FIG. 12, FIG. 14(A) and (B) respectively show a waveform of the signal synthesized by the signal adder 12_1 in scanning lines 1 and 2, and FIG. 15 shows a histogram of image signal values of the whole image shown in FIG. 12.

Figures 21A, 21B:
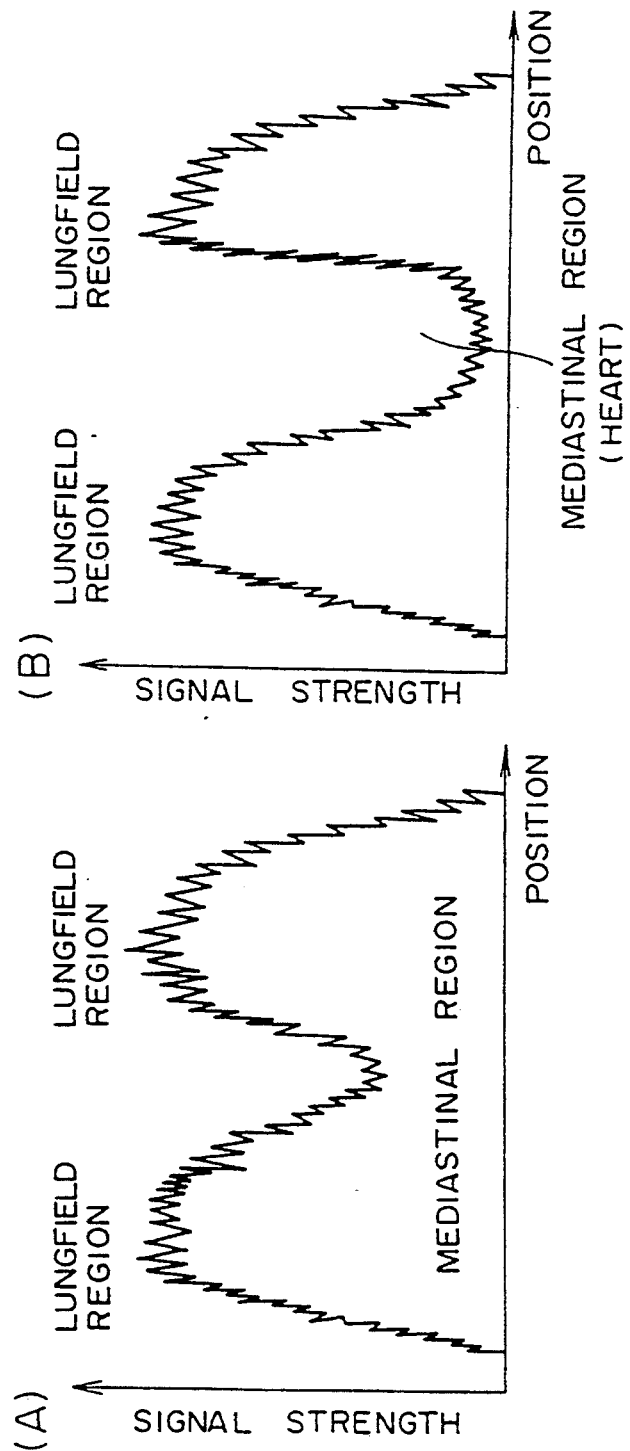
Figure 22:
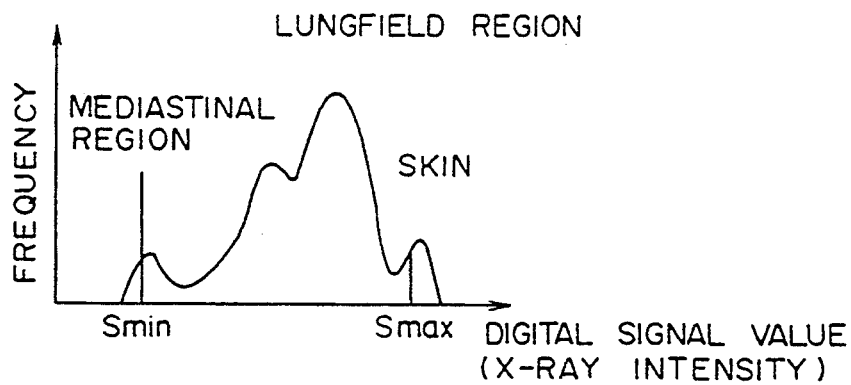
FIG. 22 is a diagram representing the histogram of image signals obtained from reading by the radiation image reading apparatus shown in FIG. 17.

In scanning along the scanning line 1 shown in FIG. 12, the quantity of radiation energy accumulated and stored in the accelerated phosphorescence fluorescent panel 3_1 is such that, since the quantity of accumulated energy at a position corresponding to the mediastinal region at the center of the image is small as shown in FIG. 21(A) in the example of the prior art, the applied voltage to the photomultiplier (PM3) is larger than that to other photomultipliers and the applied voltage to both adjacent photomultipliers (PM2 and PM4) is slightly larger than that to the photomultipliers (PM1 and PM5) at both ends. In scanning along the scanning line 2, since the quantity of the accumulated energy at a position corresponding to the mediastinal region and the heart is further smaller than that in scanning along the scanning line 1 as shown in FIG. 21(B), the applied voltage to photomultipliers (PM2, PM3 and PM4) at the center of the image further larger than that in scanning along the scanning line 1. Consequently, image signals obtained from scanning lines 1 and 2 have an approximate constant signal level as shown in FIGS. 14(A) and 14(B). The range of signal distribution of the histogram is reduced as shown in FIG. 15 by thus controlling the applied voltage to photomultipliers so that the image signals may have an approximate constant intensity. In other words, this means that the signals are compressed.

Figure 16:
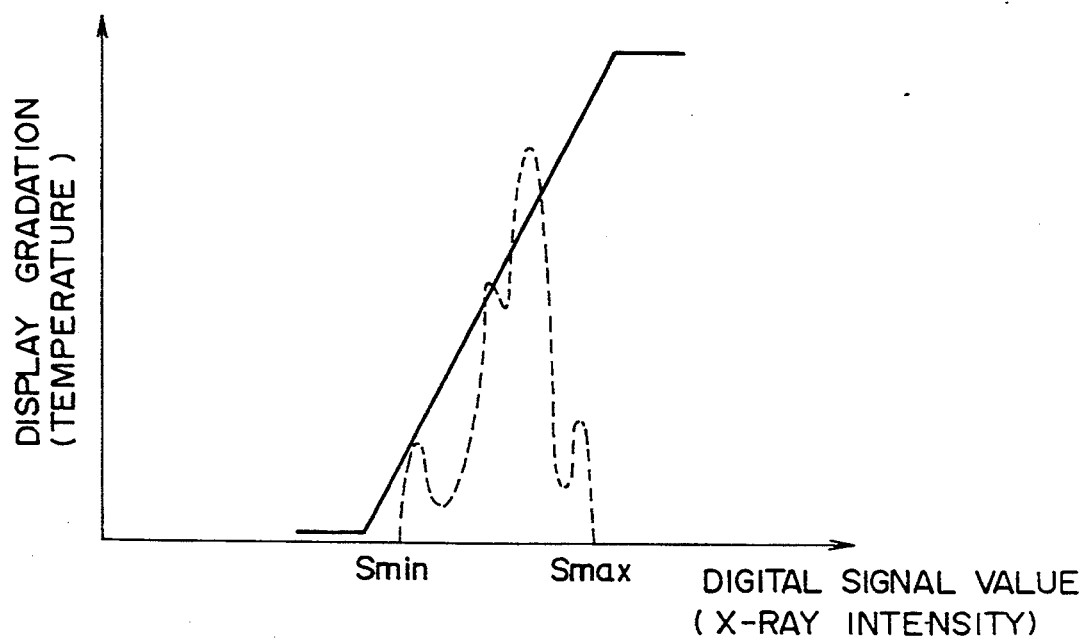
FIG. 16 is a diagram showing a display gradation curve for compressed signals.

FIG. 16 shows a display gradation curve for compressed signals.

Figure 23:
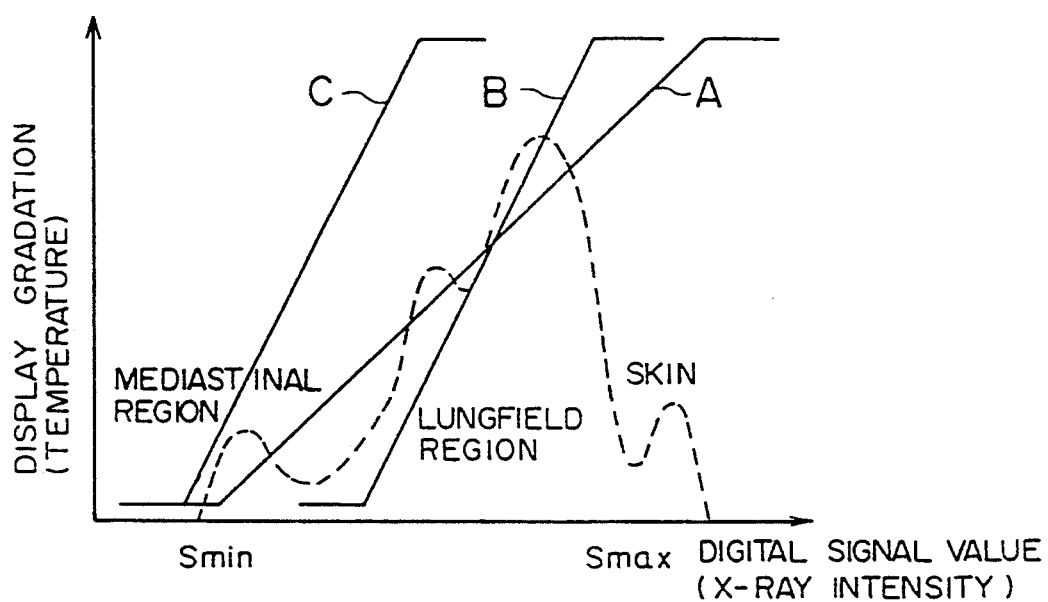
FIG. 23 is a diagram representing a display gradation curve.

As expressly known from comparison with FIG. 23 of the conventional example, the ranges of all signals can be displayed with excellent contrast resolution.

I claim:

1. A radiation image reading apparatus comprising:
main scanning means for repeatedly scanning an accelerated phosphorescence fluorescent material object on which a radiation image of a subject is accumulated and stored by using an excitation beam in a main scanning direction;

sub-scanning means for relatively moving said accelerated phosphorescence fluorescent material object or said excitation beam in a sub-scanning direction; and photoelectric conversion means for receiving accelerated phosphorescence fluorescent light which is emitted from all scanning points in response to said excitation beam and obtaining image signals which carry said radiation image, said photoelectric conversion means including a plurality of photomultipliers which are arranged along said main scanning direction and a control section which independently controls respective sensitivities of said plurality of photomultipliers by controlling voltages applied to said plurality of photomultipliers.

2. A radiation image reading apparatus comprising:

main scanning means for repeatedly scanning an accelerated phosphorescence fluorescent material object on which a radiation image of a subject is accumulated and stored by using an excitation beam in a main scanning direction;

sub-scanning means for relatively moving said accelerated phosphorescence fluorescent material object or said excitation beam in a sub-scanning direction; and photoelectric conversion means for receiving accelerated phosphorescence fluorescent light which is emitted from all scanning points in response to said excitation beam and obtaining image signals which carry said radiation image, said photoelectric conversion means including a wide range photomultiplier which has a long-range photoelectric surface which is arranged to extend in said main scanning direction and a plurality of secondary electron multiplying parts which are arranged along the lengthwise direction of said photoelectric surface, and a control section which controls independently respective sensitivities of said plurality of secondary electron multiplying parts by controlling voltages applied to the plurality of secondary electron multiplying parts.

3. A radiation image reading apparatus comprising:

main scanning means for repeatedly scanning an accelerated phosphorescence fluorescent material object on which a radiation image of a subject is accumulated and stored by using an excitation beam in a main scanning direction;

sub-scanning means for relatively moving said accelerated phosphorescence fluorescent material object of said excitation beam in a sub-scanning direction; and photoelectric conversion means for receiving accelerated phosphorescence fluorescent light which is emitted from all scanning points in response to said excitation beam and obtaining image signals which carry said radiation image, said photoelectric conversion means including a plurality of photomultipliers which are arranged along said main scanning direction and a control section which independently controls the sensitivities of said plurality of photomultipliers while said accelerated phosphorescence fluorescent material object is being scanned by said excitation beam, by controlling voltages applied to said plurality of photomultipliers.

4. A radiation image reading apparatus in accordance with claim 3, wherein said apparatus is provided with an adder for adding to one another respective output signals of said plurality of photomultipliers, and said control section independently controls respective sensitivities of said plurality of photomultipliers based on an output signal of said adder.

5. A radiation image reading apparatus in accordance with claim 4, wherein said control section controls the sensitivities of said plurality of photomultipliers, so that the intensities of output signals of said plurality of photomultipliers approximately coincide with a preset signal intensity.

6. A radiation image reading apparatus in accordance with claim 3, wherein said control section independently controls respective sensitivities of corresponding photomultipliers according to respective output signals of said plurality of photomultipliers.

7. A radiation image reading apparatus in accordance with claim 6, wherein said control section controls the sensitivities of said plurality of photomultipliers, so that the intensities of output signals of said plurality of photomultipliers approximately coincide with a present signal intensity.

8. A radiation image reading apparatus comprising:

main scanning means for repeatedly scanning an accelerated phosphorescence fluorescent material object on which a radiation image of a subject is accumulated and stored by using an excitation beam in a main scanning direction;

sub-scanning means for relatively moving said accelerated phosphorescence fluorescent material object or said excitation beam in a sub-scanning direction; and photoelectric conversion means for receiving accelerated phosphorescence fluorescent light which is emitted from all scanning points in response to said excitation beam and obtaining image signals which carry said radiation image, said photoelectric conversion means including a long range photomultiplier which has a long range photoelectric surface arranged to extend in said main scanning direction and a plurality of secondary electron multiplying parts arranged along the lengthwise direction of said photoelectric surface, and a control section which controls independently the sensitivities of said plurality of secondary electron multiplying parts while said accelerated phosphorescence fluorescent material object is being scanned by the excitation beam, by controlling the voltages applied to the plurality of secondary electron multiplying parts.

9. A radiation image reading apparatus in accordance with claim 8, wherein said apparatus is provided with an adder for adding to one another respective output signals of said plurality of secondary electron multiplying parts and said control section independently controls respective sensitivities of said plurality of secondary electron multiplying parts according to an output signal of said adder.

10. A radiation image reading apparatus in accordance with claim 9, wherein said control section controls the sensitivities of said plurality of secondary electron multiplying parts, so that the intensities of output signals of said plurality of secondary electron multiplying parts approximately coincide with a preset signal intensity.

11. A radiation image reading apparatus in accordance with claim 8, wherein said control section independently controls respective sensitivities of corresponding secondary electron multiplying parts according to respective output signals of said plurality of secondary electron multiplying parts.

12. A radiation image reading apparatus in accordance with claim 11, wherein said control section controls the sensitivities of said plurality of secondary electron multiplying parts, so that the intensities of output signals of said plurality of secondary electron multiplying parts approximately coincide with a preset signal intensity.

* * * * *

UNITED STATES PATENT AND TRADEMARK OFFICE
CERTIFICATE OF CORRECTION

PATENT NO. : 5,404,024
DATED : April 4, 1995
INVENTOR(S) : Namiki

It is certified that error appears in the above-indentified patent and that said Letters Patent is hereby corrected as shown below:

Col. 4, line 3, delete "Of" and insert --of--.

Col. 8, line 4, insert a new paragraph beginning with "FIGS. 5(A)".

Col. 8, line 18, insert a new paragraph beginning with "The condenser".

Col. 10, line 16, delete "off" and insert --of--.

Col. 12, line 25, delete "present" and insert --preset--.

Signed and Sealed this

Twentieth Day of June, 1995

BRUCE LEHMAN

*Attest:*

*Attesting Officer*        *Commissioner of Patents and Trademarks*